Patented Sept. 15, 1942

2,296,097

UNITED STATES PATENT OFFICE 2,296,097

CLEANING COMPOSITION

Alfred Emiley, New Lenox, Ill.

No Drawing. Application March 29, 1941,
Serial No. 385,848

1 Claim. (Cl. 252—160)

My invention relates to a composition of matter adapted to clean objects, and particularly the windshields of automobiles. It is among the objects of my invention to provide a composition which is gentle yet positive in its cleaning action and when removed after application leaves the windshield clean and dry. The perfect visibility thus provided for the windshield is not marred by any smear as my preparation not only removes road film but also leaves no oily film of its own. This feature eliminates spotting the eye sight of the driver, eye strain, and fatigue and assures safer driving. My invention also includes my method of preparing the composition, and applying the same for maximum results. My invention comprises such other objects, advantages and capabilities as will later more fully appear and which are inherently possessed by my invention.

While I have shown herein my preferred composition and method, yet I wish it understood that the same are susceptible of modification and change without departing from the spirit of my invention.

The preferred composition of matter selected to illustrate my invention comprises a mixture of finely powdered feldspar, calcium carbonate, technical bicarbonate of soda and bentonite, with preferably rain water, or distilled or other pure water. My composition is preferably formed of a mixture of the above ingredients in the illustrative following proportions: 12 ounces of feldspar, 8 ounces of calcium carbonate, ¾ of an ounce of technical bicarbonate of soda and 3 ounces of bentonite, together with one pint of rain, distilled or other pure water. Greater quantities in like parts may be substituted for ounces and pints.

I may vary the above proportions of my composition by using between 8 and 20 ounces or parts of feldspar, 6 to 12 ounces or parts of calcium carbonate, ½ to 1½ ounces or parts of technical bicarbonate of soda, and 2 to 5 ounces or parts of bentonite, with sufficient rain water or the like to form a paste not too wet or dry.

I may employ chalk dust in the place of calcium carbonate, or I may eliminate either of them if the amount of feldspar is increased substantially.

In my method of preparing my composition, I place the desired proportions of feldspar, calcium carbonate, technical bicarbonate of soda and bentonite, which are all in powdered form, in a mixer or rolling drum with an agitator and thoroughly mix them for fifteen or twenty minutes. I then add sufficient rain water or the like to the powdered mixture and form a paste substantially the consistency of mortar. I then let the paste stand for substantially seventy-two hours to allow the water with the aid of the bicarbonate of soda to dissolve the soluble materials, to form my homogeneous composition.

In applying my composition to a windshield, I wet a soft cloth or powder-puff, pick up a quantity of my composition thereon, and apply the same to a windshield. I then immediately rub off or remove the composition from the windshield with a dry, clean, soft cloth. This removes the road film from the windshield, leaving the same clean, dry and with no smear. My composition leaves no mucilaginous film on the windshield to pick up and hold dust, bugs and rain drops. My composition is substantially odorless, and has no destructive effect on glass, or on the paint, metal or rubber compositions of the automobile.

While my composition is particularly directed to windshields, yet it is also useful for cleaning and polishing other surfaces of glass, metal or other finishes.

Having thus described my invention, I claim:

A composition for cleaning and polishing automobile windshields consisting of the following materials in powdered form in substantially the proportions by weight as stated: feldspar 12 parts, calcium carbonate 8 parts, sodium bicarbonate ¾ of 1 part, and bentonite 3 parts and water sufficient to form a homogeneous, non-scratching paste which is not deleterious to the finish of an automobile.

ALFRED EMILEY.